United States Patent
Imai et al.

(10) Patent No.: US 6,168,314 B1
(45) Date of Patent: Jan. 2, 2001

(54) BEARING

(76) Inventors: Akira Imai; Yutaka Imai; Atsushi Imai, all of 1-24, Miyado 1-chome, Asaka-shi, Saitama (JP)

( * ) Notice: Under 35 U.S.C. 154(b), the term of this patent shall be extended for 0 days.

(21) Appl. No.: 09/354,225

(22) Filed: Jul. 15, 1999

(30) Foreign Application Priority Data

Sep. 1, 1998 (JP) ................................................ 10-247064

(51) Int. Cl.$^7$ .................................................... F16C 33/26
(52) U.S. Cl. .......................... 384/292; 384/215; 384/283
(58) Field of Search ..................................... 384/215, 218, 384/220, 221, 222, 292, 301, 282, 283

(56) References Cited

U.S. PATENT DOCUMENTS

| | | | |
|---|---|---|---|
| 1,200,060 | 10/1916 | Wemp | 384/292 |
| 1,563,663 | 12/1925 | Seabury | 384/301 X |
| 2,324,863 | 7/1943 | Merchant | 384/292 X |
| 3,167,366 | 1/1965 | Freund | 384/283 |
| 4,514,097 | 4/1985 | Daly | 384/292 |

FOREIGN PATENT DOCUMENTS 55-006005  1/1980  (JP).

*Primary Examiner*—Thomas R. Hannon
(74) *Attorney, Agent, or Firm*—McCormick, Paulding & Huber LLP

(57) ABSTRACT

A bearing has a composite elastic member, which supports a shaft. The composite elastic member comprises an elastic cylinder, which is made of an elastic material such as rubber and is provided at a bearing body section; and a spiral member, which projects from the circumferential surface of the elastic cylinder and is spirally assembled on the elastic cylinder. A lubricant is supplied to a spiral gap, which is divisionally formed between threads of the wire material forming the spiral member. When the shaft rotates, leakage of the lubricant is prevented by pumping operation and leakage of a fluid is prevented.

21 Claims, 6 Drawing Sheets

BEARING

BACKGROUND OF THE INVENTION

The present invention relates to a bearing for supporting a shaft.

A bearing is used to support rotatably a rotating shaft, to support reciprocally a shaft which linearly reciprocates in an axial direction, or to support rotatably and reciprocally a shaft in an axial direction, which rotates and reciprocates in the axial direction.

This kind of bearing may be a sliding bearing or a rolling bearing. The sliding bearing has a bearing surface which slides on and contacts with the outer circumferential surface of a shaft. The rolling bearing is provided with rolling members such as rollers or steel balls between a shaft and the bearing portion, and the shaft is supported by rolling contact therebetween.

When a shaft rotates, the shaft generates a vibration which is transmitted to the bearing. In an apparatus having a shaft, such a vibration transmitted to the bearing is also transmitted to the apparatus-side. To prevent occurrence of a vibration of the apparatus body, a vibration-proof material needs to be incorporated in the apparatus body.

It is impossible to directly support the shaft by a vibration-proof material such as rubber or soft plastics to prevent the vibration of the shaft from being transmitted directly to the bearing, because rubber or the like has a large friction coefficient so that the shaft seizes on the vibration-proof material.

Hence, the sliding bearing uses a hard material which has a small friction coefficient, such as metal like phosphor bronze or ceramics, for a bearing member. A lubricant is provided between the shaft and the bearing surface contacting the shaft, so the shaft and the bearing contact each other through an oil film without making direct contact therebetween. By thus using a hard material as a bearing member, vibration of the shaft is always transmitted to the mechanical structure through the bearing member. Besides, a lubricant must always be supplied between the shaft and the bearing surface, and shortage of oil involves seizing of the shaft.

SUMMARY OF THE INVENTION

The present invention has an object of providing a bearing capable of absorbing vibration and impact force from a shaft.

Another object of the invention is to provide a bearing in which a lubricant is provided between a shaft and a sliding surface movably supporting the shaft.

Another object of the invention is to provide a bearing in which a lubricant is provided from a lubricant container portion between a shaft and a sliding surface movably supporting the shaft.

Further another object of the invention is to provide a bearing capable of absorbing vibration applied to a static shaft.

Also, another object of the invention is to provide a bearing which returns a fluid by pumping operation obtained through rotation of a shaft.

According to the present invention, there is provided a bearing for supporting a shaft, comprising: an elastic cylinder made of an elastic material such as rubber and provided at a bearing body section; and a spiral member made of a low-friction material, which projects from a circumferential surface of the elastic cylinder, and is spirally assembled to the elastic cylinder, wherein a lubricant is supplied into a spiral gap divisionally formed between parts of the spiral member.

The elastic cylinder is fixed to the bearing body section, the spiral member projects from an inner circumferential surface of the elastic cylinder toward an inner circumferential portion of the elastic cylinder, the shaft rotatably contacts the spiral member, and the spiral member makes pumping operation in a direction in which the lubricant is returned. The elastic cylinder is fixed to the bearing body section, the spiral member projects from an inner circumferential surface of the elastic cylinder toward an inner circumferential portion of the elastic cylinder, and the shaft contacts the spiral member such that the shaft is reciprocally movable in an axial direction. The elastic cylinder is fixed to the bearing body section, the spiral member projects from an inner circumferential surface of the elastic cylinder toward an inner circumferential portion of the elastic cylinder, and the shaft contacts the spiral member such that the shaft is rotatable and reciprocally movable in an axial direction. The elastic cylinder is fixed to the bearing body section, the spiral member projects from an inner circumferential surface of the elastic cylinder toward an inner circumferential portion of the elastic cylinder, the shaft is supported and kept stationary, and vibration of the shaft is absorbed by the spiral member and the elastic cylinder. The elastic cylinder is fixed to the shaft, the spiral member projects from an outer circumferential surface of the elastic cylinder toward an outer circumferential portion of the elastic cylinder, the shaft is supported by the bearing body section such that the elastic cylinder and the spiral member are rotatable together, and the spiral member makes pumping operation in a direction in which the lubricant is returned, by rotation of the elastic cylinder and the spiral member. The elastic cylinder is fixed to the shaft in a state of being kept stationary, the spiral member projects from an outer circumferential surface of the elastic cylinder toward an outer circumferential portion of the elastic cylinder, the shaft is supported by the bearing body section such that the elastic cylinder and the spiral member are rotatable together, and vibration of the shaft is absorbed by the spiral member and the elastic cylinder. A tightening force is applied to the elastic cylinder by pressure adjuster means for applying. Also, according to the present invention, there is provided a bearing for supporting a shaft, comprising: an elastic cylinder made of an elastic material such as rubber and provided at a bearing body section; an inner spiral member made of a low-friction material, which is spirally assembled to an inner circumferential portion of the elastic cylinder such that the inner spiral member projects from an inner circumferential surface of the elastic cylinder, and contacting an outer circumferential surface of the shaft; and an outer spiral member made of a low-friction material, which is spirally assembled to an outer circumferential portion of the elastic cylinder such that the outer spiral member projects from an outer circumferential surface of the elastic cylinder, and contacting an inner circumferential surface of an installation hole. The elastic cylinder is fixed to a bearing body section through the outer spiral member, and a lubricant is supplied into a spiral gap divisionally formed by the spiral member, the inner circumferential surface of the elastic cylinder, and the outer circumferential surface of the shaft. The shaft rotatably contacts the inner spiral member, and the inner spiral member makes pumping operation in a direction in which the lubricant is returned, in accordance with rotation of the shaft. The shaft contacts the inner spiral member such that the shaft is reciprocally movable in an axial direction. The shaft contacts the inner spiral member such that the shaft is reciprocally movable and rotatable. The shaft is supported by the inner spiral member such that the shaft is kept stationary. The elastic cylinder is fixed to the shaft through the inner spiral member such that the elastic cylinder rotates together with the shaft; a lubricant is supplied into a spiral gap divisionally formed by the outer spiral member, the outer circumferential surface of the elastic cylinder, and the inner circumferential surface of the bearing body section; and the outer spiral member makes pumping operation in a direction in which the lubricant is returned, in accordance with rotation of the outer spiral member which rotates together with the shaft. The elastic cylinder is fixed to the shaft through the inner spiral member; a lubricant is supplied into a spiral gap divisionally formed by the outer spiral member, the outer circumferential surface of the elastic cylinder, and the inner circumferential surface of the bearing body section; and vibration applied to the shaft is absorbed by the inner and outer spiral members and the elastic cylinder. A tightening force is applied to the elastic cylinder in an axial direction by pressure adjuster means.

According to the bearing of the present invention, a composite elastic member comprises the elastic cylinder and the spiral member, and vibration and impact force of the shaft is absorbed by the composite elastic member. The vibration and impact force can thus be prevented from being transmitted to a mechanical structure. Since the shaft which rotates or reciprocally moves in the axial direction is supported on a spiral member made of a low-friction material, a resistance force is prevented from being effected on the moving shaft, so that smooth rotation of the shaft can be maintained. The strength of the spiral member can be arbitrarily set by changing the diameter or width size of the wire material forming the spiral member or by adjusting the pitch.

The above-described and other objects, and novel feature of the present invention will become apparent more fully from the description of the following specification in conjunction with the accompanying drawings.

DESCRIPTION OF THE PREFERRED EMBODIMENT

Embodiments of the present invention will now be explained below based on the appended drawings.

Figure 1:
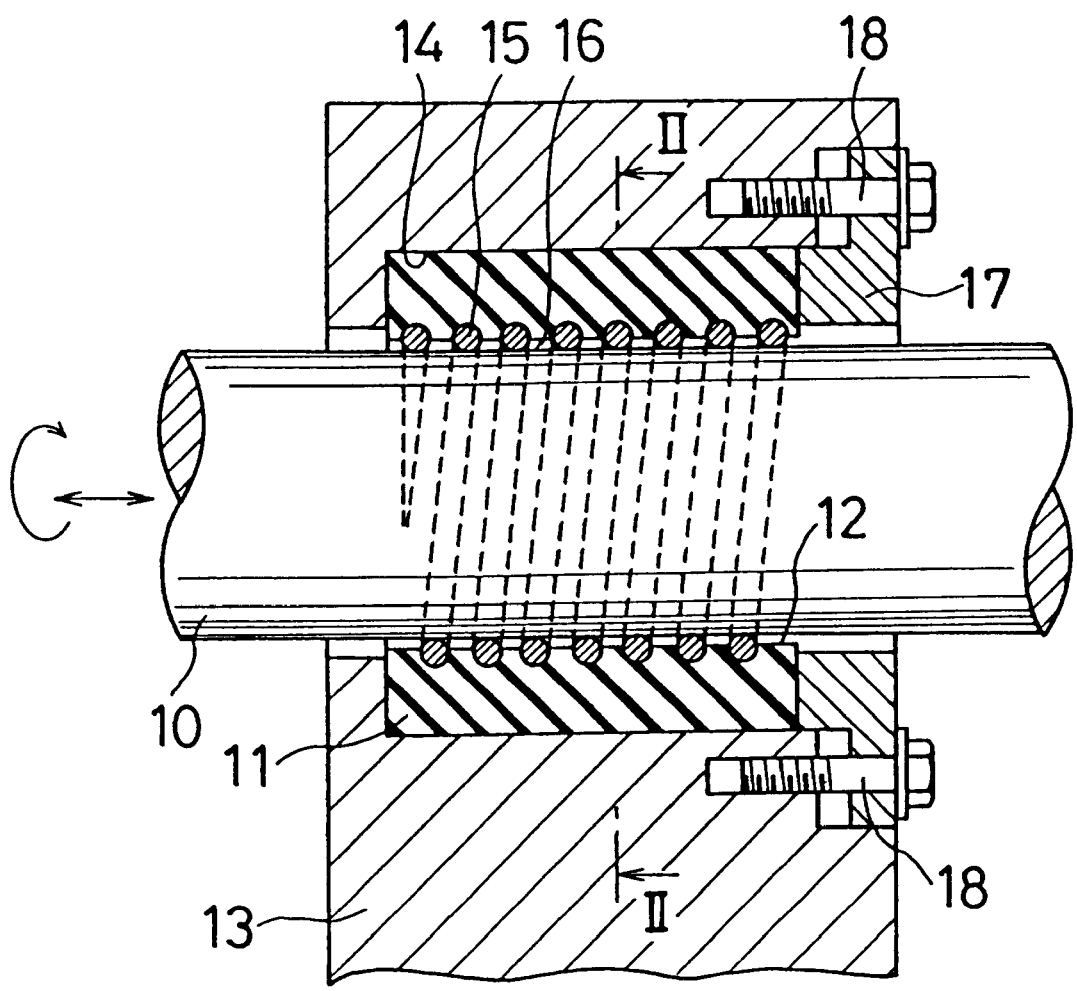
FIG. 1 is a longitudinal cross-sectional view showing a bearing according to an embodiment of the invention.
Figure 2:
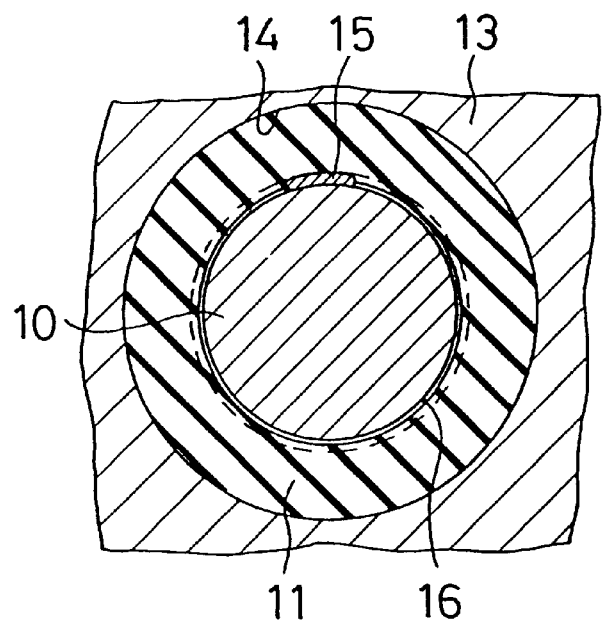
FIG. 2(A) is a lateral cross-sectional view along the line II—II in FIG. 1.
FIG. 2(B) is a lateral cross-sectional view showing another type of bearing having a similar part to that as shown in FIG. 2(A).
Figure 2:
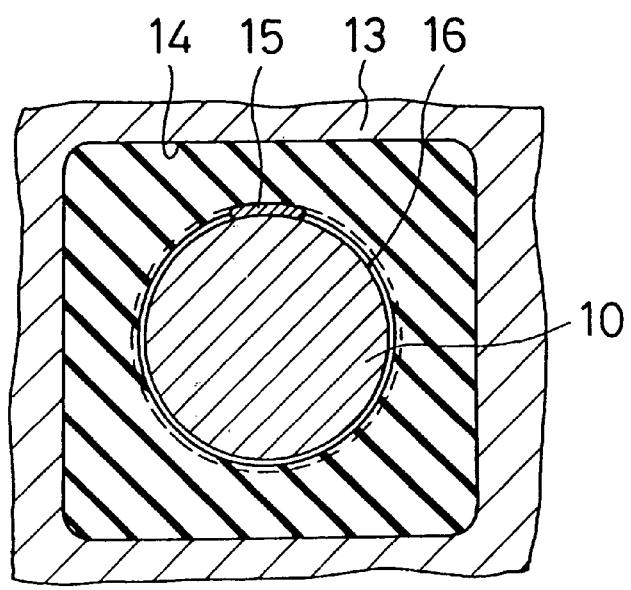

FIG. 1 is a cross-sectional view showing a bearing according to an embodiment of the present invention. FIG. 2(A) is a cross-sectional view along the line II—II in FIG. 1. This bearing is used to support a shaft 10 which rotates and reciprocates in the axial direction as indicated by an arrow. Note -that the same bearing can be used when the shaft 10 only rotates or reciprocates linearly in the axial direction. In addition, the rotating of the shaft 10 may be a direction corresponding to the arrow direction or opposite thereto.

This bearing has an elastic cylinder 11 made of an elastic material such as rubber or soft plastics. As shown in FIG. 2(A), the elastic cylinder 11 has a container hole 12, which has a circular cross-section corresponding to the outer circumference of the shaft 10 having a circular cross-section and has a larger inner diameter than the shaft 10. The outer circumference has also a circular cross-section.

The elastic cylinder 11 may be formed directly in a mechanical structure or may be engaged in an installation hole 14 of a bearing body section 13 which is attached to a mechanical structure by a screw member or the like. The bearing body section 13 is made of a hard material such as steel or the like and is rigid compared with an elastic cylinder 11.

A spiral member 15 formed like a coil is incorporated at an inner circumferential portion of the elastic cylinder 11, and the spiral member 15 is assembled such that the inner diameter side portion thereof projects from the inner circumferential portion of the container hole 12 in the radial direction inwardly. This spiral member 15 is formed of a low-friction material having a small friction coefficient, such as steel, phosphor bronze, ceramics, or the like. In case of the figure, the member is formed of a wire material having a circular crosssection.

The spiral member 15 may be assembled to the elastic cylinder 11 in such a manner that the spiral member 15 is integrally shaped in coincide with the elastic cylinder 11 when shaping the elastic cylinder 11 with use of a metal mold. Alternatively, a groove having an arc-like or triangular cross-section may be formed in the inner circumferential surface of the container hole 12 of the elastic cylinder 11, and the spiral member 15 may be assembled to be screwed into.

The spiral member 15 is made of a hard material like steel or the like. However, the member 15 is processed in form of a spiral, so that the member 15 is elastically deformed not only in the axial direction but also in the diameter direction although the deformation amount thereof is smaller than that of the elastic cylinder 11. Accordingly, the shaft 10 is supported by a composite elastic member comprising the elastic cylinder 11 having a small elastic coefficient and the spiral member 15 having a larger elastic coefficient than the cylinder 11.

Thus, the composite elastic member supporting the shaft 10 includes an elastic cylinder 11 formed of an elastic member such as rubber or the like, and, even if the shaft 10 vibrates in the radial direction, the vibration or impact force therefrom is absorbed by the elastic cylinder 11. Further, the shaft 10 makes direct contact only with the spiral member 15 made of a hard low friction material formed of a hard low-friction material such as phosphor bronze or the like. Since the spiral member 15 has a low friction coefficient, no resistive force is added to rotation or reciprocal motion of the shaft 10. Although this spiral member 15 is formed of a hard material, the member 15 has certain elasticity because it has a spiral shape. Even when the shaft 10 is displaced so as to incline the center axis of it, the spiral member 15 is deformed such that the contact state is maintained in accordance with the outer circumferential surface.

In case where the spiral member 15 is formed by a wire material having a circular cross-section, as shown in FIG. 1, the strength or elastic coefficient of the spiral member 15 can be adjusted by changing the diameter of the wire material or by changing the pitch size. By further selecting the material of the elastic cylinder 11 in accordance with such adjustment, the elastic force or coefficient of the overall composite elastic member can be adjusted.

Between winds of the spiral member, a spiral gap 16 is formed and constitutes a space enclosed between the outer circumferential surface of the shaft 10 and the inner circumferential surface of the container hole 12 of the elastic cylinder. If a lubricant such as grease or the like is filled in the spiral gap forming a lubricant container space, the lubricant is prevented from flowing out through the spiral gap 16 when the shaft 10 rotates or reciprocally moves, and the lubricant can be supplied securely between the inner circumferential surface of the spiral member 15 and the outer circumferential surface of the shaft 10.

Besides, when the shaft 10 is kept stationary, a part of the shaft 10 is in contact with the spiral member 15. However, when the shaft 10 rotates, the contact position of the inner circumferential surface of the spiral member 15 shifts every moment in relation to the shaft 10. As a result, the shaft 10 is supported by the spiral member 15 so as to slide on the overall surface of the shaft 10, so the outer circumferential surface of the shaft 10 is kept supplied with a lubricant.

The spiral gap 16 has a small cross-sectional area and continuously maintains the form of spiral, so that the gap has a long size extending spirally, compared with the length of the composite elastic member. Therefore, when the bearing is used for a mechanical structure in which a gas or liquid is enclosed, a fluid such as a liquid filled in one side of the bearing is squeezed by the spiral gap 16 having a long size, so that the enclosed fluid is prevented from leaking. In particular, when the shaft 10 rotates, the pumping operation can be effected onto the fluid in the direction in which the enclosed fluid is returned, depending on the rotating and the fluid therefore receives a force in the direction in which the fluid is returned, so that leakage of the fluid can be prevented securely.

A cap 17 having a ring section engaged in the installation hole 14 and a flange section screwed on the bearing body section 13 can be attached to the bearing body section 13. By tightening the cap 17 onto the bearing body section 13 by a bolt 18, the elastic cylinder 11 is fixed to the bearing body section 13. By adjusting the tightening position of the cap 17 in relation to the axial direction, the tightening force of the elastic cylinder 11 can be changed to adjust to the elastic deformation amount of the elastic cylinder 11. This cap 17 thus forms a pressure adjuster means.

As shown in FIG. 2(A), the outer circumferential surface of the elastic cylinder 11 is arranged to be circular in consistence with the cross-sectional shape of the inner circumferential surface of the installation hole 14. However, this outer circumferential surface may be substantially rectangular as shown in FIG. 2(B).

Figure 3:
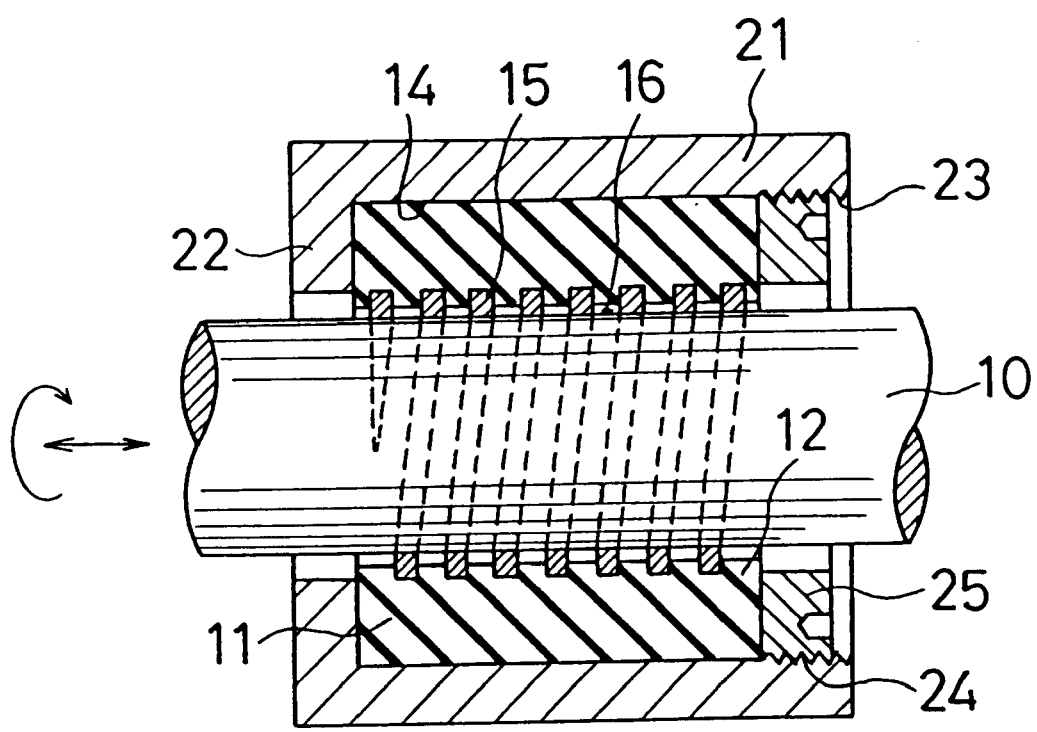
FIG. 3 is a longitudinal cross-sectional view showing a bearing according to another embodiment of the invention.

FIG. 3 is a cross-sectional view showing a bearing according to another embodiment of the present invention, and the bearing body section is formed by a cylindrical bearing case 21. An elastic cylinder 11 is provided in an installation hole 14 defined by the inner circumferential surface of the bearing body section. This bearing can be attached to a mechanic structure in form of a unit.

A spiral member 15 assembled in the elastic cylinder 11 is formed of a wire material having a rectangular cross-section. As shown in FIG. 1, in case where the spiral member 15 is formed of a wire material having a circular cross-section, the spiral member 15 has a line contact with the outer circumferential surface of the shaft 10. In contrast, in case where the spiral member 15 is formed of a wire material having a rectangular cross-section, the spiral member 15 makes an area contact in form of a strip. In this case, as shown in FIG. 3, the strength of the spiral member 15 can be adjusted by adjusting the width size of the wire material having a rectangular cross-section.

A flange section 22 for fixing the elastic cylinder 11 is provided at an end portion of the bearing case 21, and a female thread 23 is formed in the inner circumferential surface of the other end portion. A male thread 24 to be coupled with the female thread 23 is formed on a tightening cap 25. This tightening cap 25 is attached to the bearing case 21. By rotating the tightening cap 25, the position in the axial direction is adjusted, so that the elastic deformation amount of the elastic cylinder 11 can be adjusted.

Like the bearing shown in FIG. 1, the bearing shown in FIG. 3 can be used to support the shaft 10 such that the shaft 10 can freely rotate and reciprocally move in the axial direction or such that the shaft 10 can either rotate or reciprocate in the axial direction. In particular, when the shaft 10 rotates, pumping operation can be effected onto the fluid enclosed in one side of the bearing in the direction in which the fluid is returned, depending on the rotating direction, thereby to prevent securely leakage of the fluid.

Figure 4:
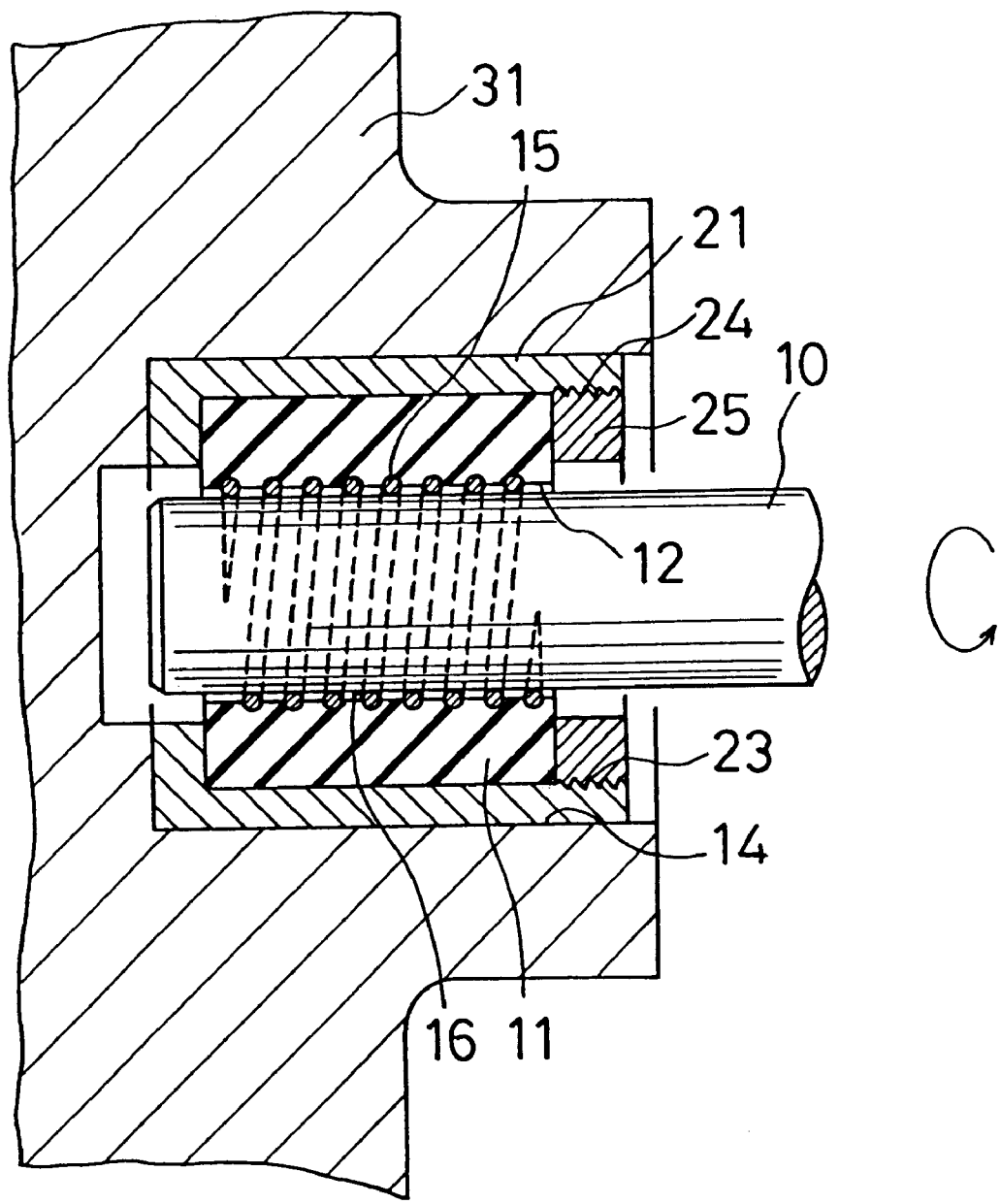
FIG. 4 is a longitudinal cross-sectional view showing a bearing according to further another embodiment of the invention.

FIG. 4 is a view showing a bearing according to another embodiment of the present invention. Like the bearing shown in FIG. 3, a bearing body section is formed by a bearing case 21, and thus, a composite elastic member comprising an elastic cylinder 11 and a spiral member 15 is thus contained in the bearing case 21. Further, this bearing is attached to a mechanical structure 31 and supports a rotary shaft 10 at an end portion of the bearing. Accordingly, this shaft 10 only rotates but does not reciprocally move in the axial direction. Thus, the bearing shown in FIG. 4 is used to support the shaft 10 which only rotates but which does not reciprocate in the axial direction.

Figure 5:
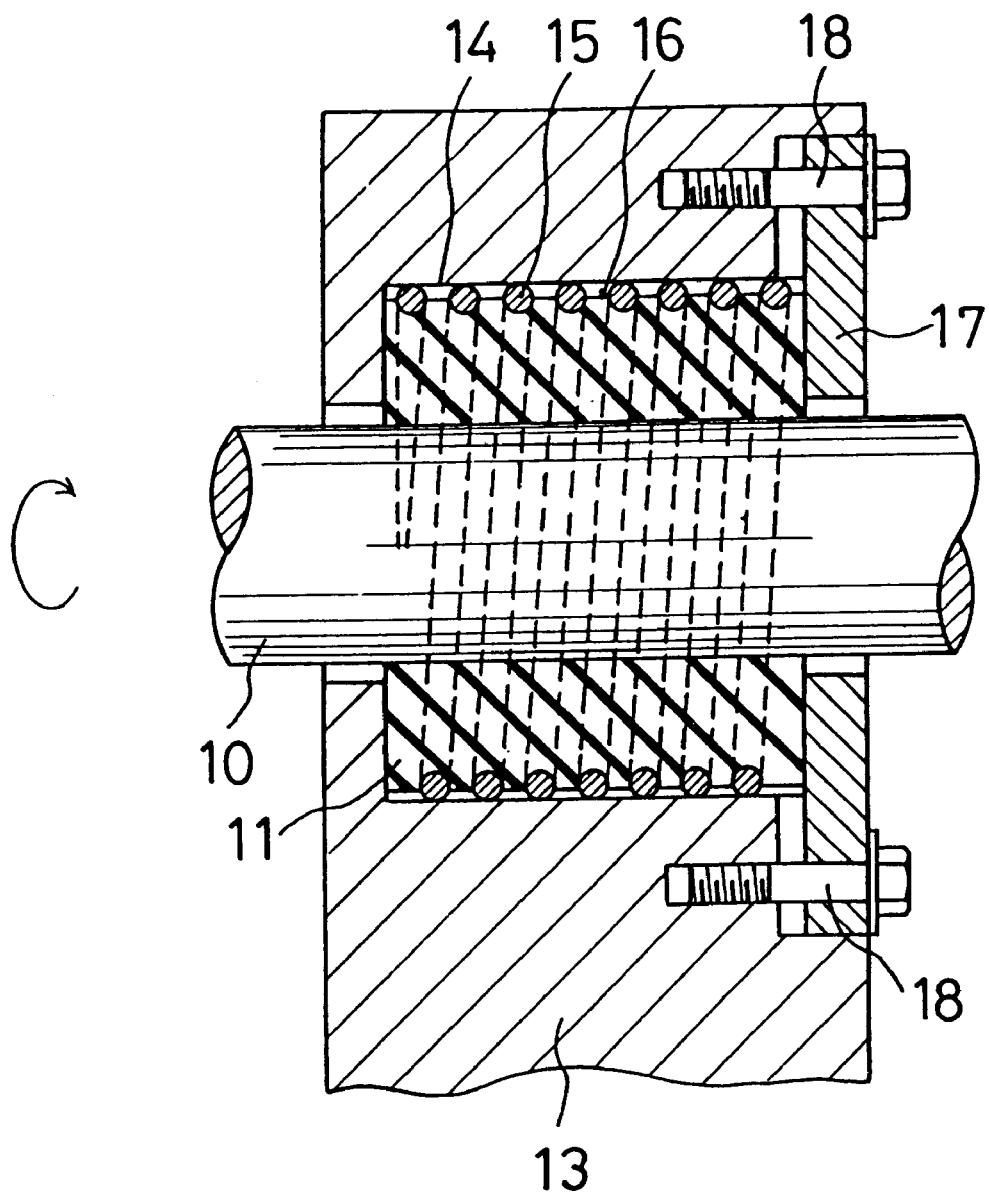
FIG. 5 is a longitudinal cross-sectional view showing a bearing according to further another embodiment of the invention.

FIG. 5 is a view showing a bearing according to further another embodiment of the present invention. In this case, an elastic cylinder 11 is fixed to a rotary shaft 10, and a spiral member 15 is assembled on the outer circumferential portion of the elastic cylinder 11 such that the member 15 projects from the outer circumferential surface of the cylinder in the radial direction toward the outside. The outer circumferential surface of the spiral member 15 has contact with an installation hole 14 as a container hole formed in the bearing body section 13.

Therefore, when the shaft 10 rotates, a composite elastic member comprising the elastic cylinder 11 and the spiral member 15 rotates integrally together, and the outer circumferential surface of the spiral member 15 slides on the inner circumferential surface of the installation hole 14. In this case as well, when the shaft 10 vibrates in the radial direction, vibration or impact force of the shaft is absorbed by the elastic cylinder 11 and the spiral member 15 and is prevented from being transmitted to the bearing body section 13. In the bearing shown in FIG. 5, a lubricant is enclosed in the spiral gap 16, and the shaft 10 and the spiral member 15 contact each other through an oil film. In this case, since the elastic cylinder 11 rotates integrally with the shaft 10, a thrust bearing should preferably be provided in both sides of the elastic cylinder 11.

Figure 6:
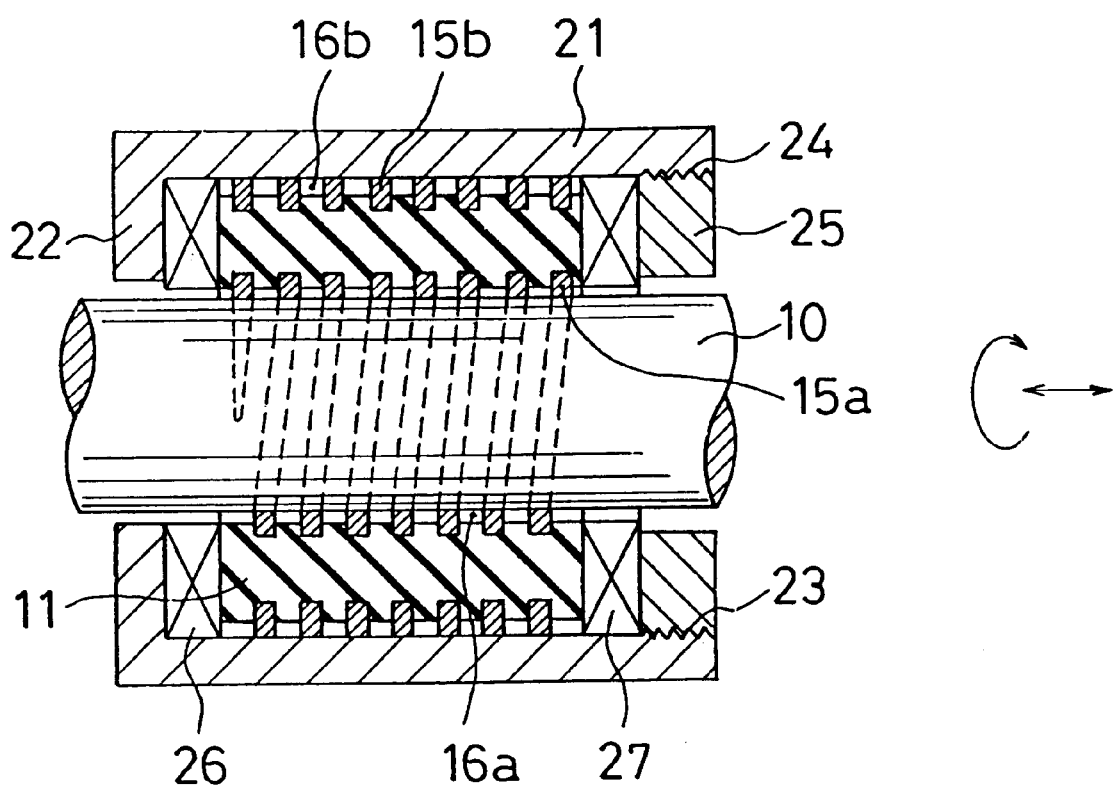
FIG. 6 is a longitudinal cross-sectional view showing a bearing according to further another embodiment of the invention.

FIG. 6 is a cross-sectional view showing a bearing according to further another embodiment of the present invention.

In this case, a spiral members 15a and 15b are assembled on the inner circumferential portion of the elastic cylinder 11 such that the member 15a projects from the inner circumferential surface in the radial direction toward the outside and further such that the member 15b projects from the outer circumferential surface in the radial direction toward the inside. In this case, if the strength of the engagement between the shaft 10 and the inner spiral member 15a is set to be stronger than the strength of the engagement with an outer spiral member 15b, the spiral member 15a rotates integrally with the elastic cylinder 11 and the shaft 10. Otherwise, if the strength of the engagement is set inversely, the elastic cylinder 11 and both of the spiral members 15a and 15b are kept stationary. In this case, a lubricant is supplied to the spiral member in the sliding-side.

If the elastic cylinder 11 rotates, thrust bearings 26 and 27 are preferably provided at both sides of the cylinder 11. However, if the elastic cylinder 11 is kept stationary without rotating, the thrust bearings 26 and 27 need not be provided. Thus, in case where the spiral members 15a and 15b are respectively provided in both inner and outer sides of the elastic cylinder 11, the elastic cylinder 11 is sandwiched between the spiral members 15a and 15b having a relatively high strength, so that the vibration-proof effect can be improved while totally increasing the strength of the composite elastic member.

In the case shown in FIG. 6, each of the spiral members 15a and 15b is formed of a wire material having a quadrangular cross-section. However, the spiral member may be formed of a wire material having a circular cross-section.

In each of the embodiments, if a lubricant is collected to one side in the axial direction due to rotation of the shaft 10, a return oil channel may be provided so as to return the lubricant from one end side of the bearing to the other end side thereof. A member such as a lip seal or the like for preventing leakage of a lubricant may be provide at one side to which the lubricant is collected or at both sides. In addition, if the elastic cylinder 11 is formed of a porous material and a lubricant is impregnated into the elastic cylinder 11, a lubricant can be continuously supplied from the elastic cylinder 11 into the spiral gap 16.

In each of the embodiments described above, explanation has been made for cases where the shaft 10 rotates and/or reciprocates in the axial direction. The present invention is applicable not only to those cases where the shaft 10 rotates and/or reciprocates but also to cases where the shaft 10 is fixed in a stationary state. For example, as shown in FIG. 4, in case where an end portion of the shaft 10 is supported by a bearing, the shaft 10 can be fixedly supported by the bearing. In this case, if the end portion of the shaft 10 is pressed into the spiral member 15 forming part of the composite elastic member, the shaft 10 can be prevented from being off from the bearing even if the shaft vibrates due to an elastic force applied to the shaft 10 by the elastic cylinder 11.

If the shaft 10 is fixedly supported, the contact pressure against the shaft 10 by the spiral member 15 should desirably be set to be higher compared with a case where the shaft 10 rotates or reciprocates.

The present invention should not be limited to the embodiment described above, and may be variously modified within the scope of the invention not departing from the gist. For example, the bearing is applicable to a case where the shaft 10 reciprocally rotates such that the shaft rotates by a predetermined angle and then rotates inversely by a predetermined angle.

According to the present invention, since the bearing has a composite elastic member comprising an elastic cylinder made of an elastic material and a spiral member made of a low-friction material, sealing between the shaft and the bearing can be secured. In addition, since vibration and impact force transmitted to the shaft can be absorbed by the bearing, the moving shaft can be supported quietly. The bearing can be assembled by installing the composite elastic member comprising an elastic cylinder and a spiral member, so that assembly is facilitated.

What is claimed is:

1. A bearing for supporting a shaft, comprising:
   an elastic cylinder made of an elastic material and provided at a bearing body section;
   a spiral member made of a low-friction material, which projects from a circumferential surface of said elastic cylinder and is spirally assembled to said elastic cylinder; and
   a spiral gap divisionally formed between parts of said spiral member, into which a lubricant is supplied.

2. A bearing according to claim 1, wherein said elastic cylinder is fixed to said bearing body section, said spiral member projects from an inner circumferential surface of said elastic cylinder toward an inner circumferential portion of said elastic cylinder, said shaft rotatably contacts said spiral member, and said spiral member makes pumping operation in a direction in which said lubricant is returned.

3. A bearing according to claim 1, wherein said elastic cylinder is fixed to said bearing body section, said spiral member projects from an inner circumferential surface of said elastic cylinder toward an inner circumferential portion of said elastic cylinder, and said shaft contacts said spiral member such that said shaft is reciprocally movable in an axial direction.

4. A bearing according to claim 1, wherein said elastic cylinder is fixed to said bearing body section, said spiral member projects from an inner circumferential surface of said elastic cylinder toward an inner circumferential portion of said elastic cylinder, and said shaft contacts said spiral member such that said shaft is rotatable and reciprocally movable in an axial direction.

5. A bearing according to claim 1, wherein said elastic cylinder is fixed to said bearing body section, said spiral member projects from an inner circumferential surface of said elastic cylinder toward an inner circumferential portion of said elastic cylinder, said shaft is supported and kept stationary, and vibration of said shaft is absorbed by said spiral member and said elastic cylinder.

6. A bearing according to claim 1, wherein said elastic cylinder is fixed to said shaft, said spiral member projects from an outer circumferential surface of said elastic cylinder toward an outer circumferential portion of said elastic cylinder, said shaft is supported by said bearing body section such that said elastic cylinder and said spiral member are rotatable together, and said spiral member makes pumping operation in a direction in which said lubricant is returned, by rotation of the elastic cylinder and said spiral member.

7. A bearing according to claim 1, wherein said elastic cylinder is fixed to said shaft in a state of being kept stationary, said spiral member projects from an outer circumferential surface of said elastic cylinder toward an outer circumferential portion of said elastic cylinder, said shaft is supported by said bearing body section such that said elastic cylinder and said spiral member are rotatable together, and vibration of said shaft is absorbed by said spiral member and said elastic cylinder.

8. A bearing according to claim 1, further comprising pressure adjuster means for applying a tightening force to said elastic cylinder in an axial direction.

9. A bearing according to claim 1, wherein said elastic material is rubber.

10. A bearing according to claim 1, wherein said elastic material is a soft plastic material.

11. A bearing for supporting a shaft, comprising:
   an elastic cylinder made of an elastic material and provided at a bearing body section;
   an inner spiral member made of a low-friction material, which is spirally assembled to an inner circumferential portion of said elastic cylinder such that said inner spiral member projects from an inner circumferential surface of said elastic cylinder, said inner spiral member contacting an outer circumferential surface of said shaft; and
   an outer spiral member made of a low-friction material, which is assembled spirally to an outer circumferential portion of said elastic cylinder such that said outer spiral member projects from an outer circumferential surface of said elastic cylinder, said outer spiral member contacting an inner circumferential surface of an installation hole.

12. A bearing according to claim 11, wherein said elastic cylinder is fixed to a bearing body section through said outer spiral member, and a lubricant is supplied into a spiral gap divisionally formed by said spiral member, said inner circumferential surface of said elastic cylinder, and said outer circumferential surface of said shaft.

13. A bearing according to claim 12, wherein said shaft rotatably contacts said inner spiral member, and said inner spiral member makes pumping operation in a direction in which said lubricant is returned, in accordance with rotation of said shaft.

14. A bearing according to claim 12, wherein said shaft contacts said inner spiral member such that said shaft is reciprocally movable in an axial direction.

15. A bearing according to claim 12, wherein said shaft contacts said inner spiral member such that said shaft is reciprocally movable and rotatable.

16. A bearing according to claim 12, wherein said shaft is supported by said inner spiral member such that said shaft is kept stationary.

17. A bearing according to claim 11, wherein said elastic cylinder is fixed to said shaft through said inner spiral member such that said elastic cylinder rotates together with said shaft;
   a lubricant is supplied into a spiral gap divisionally formed by said outer spiral member, said outer circumferential surface of said elastic cylinder, and said inner circumferential surface of said bearing body section; and
   said outer spiral member makes pumping operation in a direction in which said lubricant is returned, in accordance with rotation of said outer spiral member which rotates together with said shaft.

18. A bearing according to claim 11, wherein said elastic cylinder is fixed to said shaft through said inner spiral member;
   a lubricant is supplied into a spiral gap divisionally formed and formed by said outer spiral member, said outer circumferential surface of said elastic cylinder, and said inner circumferential surface of said bearing body section; and
   vibration applied to said shaft is absorbed by said inner and outer spiral members and said elastic cylinder.

19. A bearing according to claim 11, further comprising pressure adjuster means for applying a tightening force to said elastic cylinder in an axial direction.

20. A bearing according to claim 11, wherein said elastic material is rubber.

21. A beating according to claim 11, wherein said elastic material is a soft plastic material.

* * * * *